US008027330B2

(12) United States Patent
Paddon et al.

(10) Patent No.: US 8,027,330 B2
(45) Date of Patent: Sep. 27, 2011

(54) EFFICIENT CLASSIFICATION OF NETWORK PACKETS

(75) Inventors: Michael Paddon, Kellyville (AU); Gregory Gordon Rose, San Diego, CA (US); Philip Michael Hawkes, Ashfield (AU)

(73) Assignee: QUALCOMM Incorporated, San Diego, CA (US)

( * ) Notice: Subject to any disclaimer, the term of this patent is extended or adjusted under 35 U.S.C. 154(b) by 876 days.

(21) Appl. No.: 11/158,588

(22) Filed: Jun. 21, 2005

(65) Prior Publication Data

US 2005/0286522 A1 Dec. 29, 2005

Related U.S. Application Data

(60) Provisional application No. 60/582,442, filed on Jun. 23, 2004, provisional application No. 60/588,549, filed on Jul. 15, 2004, provisional application No. 60/588,674, filed on Jul. 15, 2004.

(51) Int. Cl.
*H04L 12/28* (2006.01)

(52) U.S. Cl. ....................................................... 370/351

(58) Field of Classification Search .................. 370/351, 370/389; 707/687, 694, 705, 758, 781, 790, 707/791, 802, 803; 712/1, 2, 4, 7
See application file for complete search history.

(56) References Cited

U.S. PATENT DOCUMENTS

| 5,805,824 | A | * | 9/1998 | Kappe ............................ 709/242 |
| 5,916,305 | A | * | 6/1999 | Sikdar et al. ................... 709/236 |
| 5,951,651 | A |   | 9/1999 | Lakshman et al. |
| 6,510,164 | B1 | * | 1/2003 | Ramaswamy et al. ......... 370/466 |
| 6,549,538 | B1 | * | 4/2003 | Beck et al. ................. 370/395.52 |
| 6,691,168 | B1 | * | 2/2004 | Bal et al. ........................ 709/238 |
| 6,859,455 | B1 | * | 2/2005 | Yazdani et al. ............... 370/392 |
| 2003/0123459 | A1 |   | 7/2003 | Liao |
| 2004/0155695 | A1 | * | 8/2004 | Kumar et al. .................. 327/407 |
| 2005/0169282 | A1 | * | 8/2005 | Wittman ....................... 370/401 |
| 2006/0253903 | A1 | * | 11/2006 | Krumel ........................... 726/13 |

OTHER PUBLICATIONS

Beckmann et al., "An Efficient and Robust Access Method for Points and Rectangles."
Gutton, Antonin, "R-Trees: A Dynamic Index Structure for Spatial Searching," University of California, Berkeley, SIGMOD Conference, 47-57 (1984).
Manolopoulos et al., "R-Trees have Grown Everywhere," University of Piraeus, Greece, (2003).
Sellis et al., "The R+-Tree: A Dynamic Index for Multi-Dimensional Objects", Proceedings of the 13$^{th}$ VLDB Conference, 507-518 (1987).

(Continued)

*Primary Examiner* — Derrick Ferris
*Assistant Examiner* — Omar Ghowrwal
(74) *Attorney, Agent, or Firm* — Florin C. Corle

(57) ABSTRACT

Embodiments describe a system and/or method for efficient classification of network packets. According to an aspect a method includes describing a packet as a feature vector and mapping the feature vector to a feature space. The method can further include defining a feature prism, classifying the packet relative to the feature prism, and determining if the feature vector matches the feature prism. If the feature vector matches the feature prism the packet is passed to a data recipient, if not, the packet is blocked. Another embodiment is an apparatus that includes an identification component that defines at least one feature of a packet and a classification component that classifies the packet based at least in part upon the at least one defined feature.

37 Claims, 9 Drawing Sheets

OTHER PUBLICATIONS

Marios Hadjieleftheriou, Spatial Index Library, http://www.cs.ucr.edu/~marioh/spatialindex/.
The OpenBSD Project, www.openbsd.org.
International Search Report and Written Opinion—PCT/US2005/022023, International Search Authority—European Patent Office—Sep. 14, 2005.

* cited by examiner

EFFICIENT CLASSIFICATION OF NETWORK PACKETS

This application claims the benefit of U.S. Provisional Application Ser. No. 60/582,442, filed Jun. 23, 2004, entitled "EFFICIENT CLASSIFICATION OF NETWORK PACKETS," and U.S. Provisional Application Ser. No. 60/588,549, filed Jul. 15, 2004, entitled "SCALABLE REMOTE FIREWALLS," and U.S. Provisional Application Ser. No. 60/588,674, filed Jul. 15, 2004, entitled "SYSTEM AND METHOD FOR EFFICIENT CLASSIFICATION OF NETWORK PACKETS," the entireties of which are incorporated herein by reference.

BACKGROUND

I. Field

The following description relates generally to data communication and more particularly to efficient classification of network packets and scalable firewalls.

II. Background

Firewalls are a type of system designed to protect unauthorized access to or from a private network and can be implemented in hardware, software, or a combination of both hardware and software. The recent trend in firewall protection is toward "personal firewalls." The security benefits of this trend have been positive and have provided an improvement in configurability, utility, and (in the case of mobile devices) portability of firewalls. This is referred to as the "every node is a firewall" model, which presumes the underlying fundamental economic assumption that the cost of delivery of unwanted packets is negligible. This economic assumption is not always correct, especially in the realm of wireless communication.

To be effective in contexts where packet delivery costs are not negligible, firewalls should mitigate the volume of unwanted traffic; even a small reduction of such unwanted traffic is a net gain. The more precisely a firewall policy fits the actual traffic requirements of a legitimate node population, the more effective the policy and the greater the mitigation of unwanted traffic volume. Therefore, firewalls in these contexts should permit remote ad hoc updates to the policy from authorized sources.

A common type of firewall is a packet filter that passes or blocks packets, but otherwise leaves the traffic flow untouched. At the core of each packet filter is a mechanism that classifies packets according to a supplied policy. Stateful packet filters (such as OpenBSD's pf) possess scalable mechanisms for processing packets that belong to established traffic flows. Packets that do not belong to an established flow are classified according to a policy, which is expressed as a set of rules. Rules are generally processed in sequence order to assess each packet.

Some packet classifiers employ optimization techniques to their rule sets in order to speed up packet processing. Facilities for early termination of rule processing under specified circumstances are common. A more sophisticated example is pf's skipsteps, which enable predictive skipping when contiguous rule blocks could never match a packet. Such techniques can be very effective if the rule set is highly ordered and exhibits strong commonality in rule criteria. However, in a highly dynamic environment, where there are ongoing incremental updates to the rule set, these conditions are not generally met.

Traditionally, classifier rule sets tend to be quite static in nature, and are often updated through a manual process. Since extant classifiers typically exhibit sequence dependent behavior, it is generally difficult to insert and remove arbitrary rules from a policy without unwanted or unintended side effects.

Nodes protected by a centralized packet filter may wish to extend service (typically by listening for packets that initiate a flow) at any time. Similarly, they may wish to retract previously offered services. This is consistent with the Internet end-to-end model. If the maximum number of unwanted packets is to be blocked while allowing ad hoc service extension and retraction, the filtering policy must be dynamically updated by nodes as changes occur. The filter should also have a mechanism (such as keep-alives) to discover when a node departs the network abruptly, so that obsolete rules can be removed from the policy in a timely fashion.

SUMMARY

The following presents a simplified summary of one or more embodiments in order to provide a basic understanding of some aspects of such embodiments. This summary is not an extensive overview of the one or more embodiments, and is intended to neither identify key or critical elements of the embodiments nor delineate the scope of such embodiments. Its sole purpose is to present some concepts of the described embodiments in a simplified form as a prelude to the more detailed description that is presented later.

Embodiments describe a method and/or system for efficient classification of network packets. In accordance with one feature, a method for classifying a packet is provided. The method includes describing a packet as a feature vector and mapping the feature vector to a feature space. The feature vector can be an n-dimensional feature and the feature space can be an n-dimensional feature space. The feature vector can comprise features represented by a number wherein the number is within a predetermined range and can be generated based on at least one feature of the packet. According to another aspect, the method can include defining a feature prism, classifying the packet relative to the feature prism, and determining if the feature vector matches the feature prism. The packet is classified based on the result of this matching process. For instance, if the feature vector matches the feature prism, the packet is passed to a recipient; otherwise it is blocked.

According to yet another embodiment is an apparatus for classifying a packet. The apparatus includes an identification component that defines at least one feature of the packet and a classification component that classifies the packet based at least in part upon the at least one defined feature. The identification component can further define the at least one feature of the packet as a number that is included within a predetermined range. A prognosis component can also be included that generates a stateful feature based at least in part on information from previous packets. Also included can be a comparison component that applies matching techniques to facilitate categorizing the data access of the packet. The packet feature can be an included feature that is present in the packet, a generated feature that is synthesized from values in the packet, and/or a stateful feature.

According to a further embodiment is a computer readable medium having computer-executable instructions for inserting prisms into a spatial index. A packet is matched against these prisms by performing a point queries on the index with the packet's feature vector.

According to a further embodiment is a processor that executes instructions for applying packet matching. The instructions include constructing a spatial index and inserting prisms into the spatial index. The packets are matched against prisms by performing point queries on the spatial index.

To the accomplishment of the foregoing and related ends, one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

TERMINOLOGY

Figure 1:
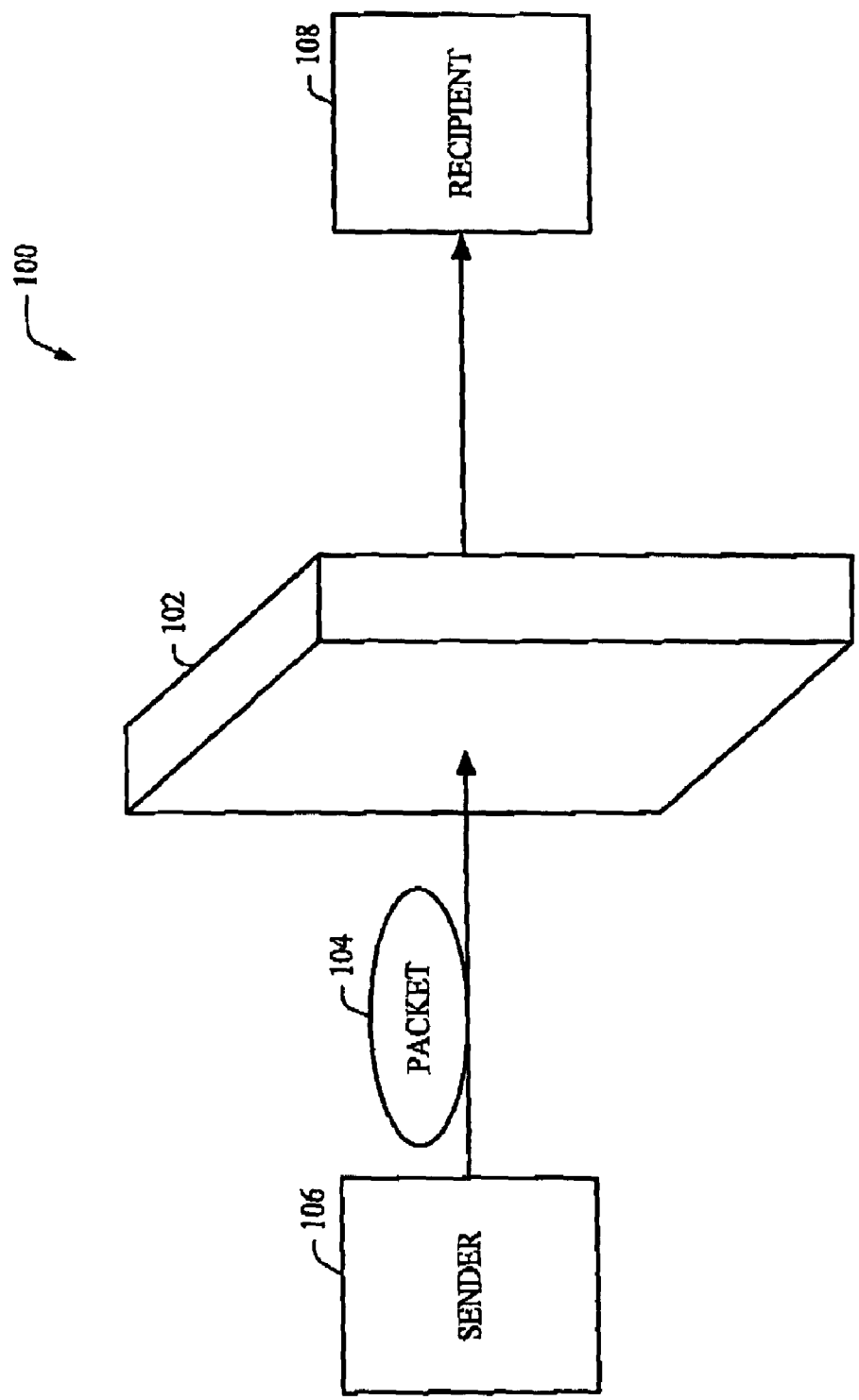
FIG. 1 illustrates a block diagram of a communication system utilizing firewall technology.

Affine space—A vector space in which axes are not necessarily mutually perpendicular, nor have the same unit measure.

Complexity—A mathematical measure of the way in which an algorithm scales.

Cuboid—A prism (convex solid), in which all faces are rectangles.

Feature prism—An n dimensional axes aligned cuboid in n dimensional feature space.

Feature space—A finite n dimensional affine space, in which the nth axis represents the range of the nth feature.

Feature vector—A vector of specific feature values.

Firewall—A device that applies a security policy to traversing network traffic.

ICMP—Internet Control Message Protocol. Utilized to send control messages between Internet hoses. Variants include ICMPv6 (for use with IPv6).

IP—Internet protocol. Variants include IPv4 (version 4) and IPv6 (version 6).

Packet—The transmission unit in a network.

Packet filter—A mechanism that selects specific packets to forward or discard.

Stateful—An algorithm that stores information from previous iterations for potential use in later iterations.

Stateless—An algorithm in which each iteration is independent from all others.

Upper layer protocol—The protocol of a packet's payload.

R-tree—A common spatial data structure. Variants include R+-trees and R*-trees.

TCP—Transmission Control Protocol. Commonly utilized for stream based data transfer on the Internet.

UDP—User Datagram Protocol. Commonly utilized for datagram based data transfer on the Internet.

DETAILED DESCRIPTION

Various embodiments are now described with reference to the drawings. In the following description, for purposes of explanation, numerous specific details are set forth in order to provide a thorough understanding of one or more aspects. It may be evident, however, that such embodiment(s) may be practiced without these specific details. In other instances, well-known structures and devices are shown in block diagram form in order to facilitate describing these embodiments.

As used in this application, the terms "component," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In a wireless network, it is desirable to place firewall functionality at the network periphery to reduce unwanted and/or unnecessary wireless data transmission. The bandwidth of an air interface is a scare resource, thus, a goal is to never transmit and/or to minimize transmitting packets that would be dropped by the receiver.

It is likely that a firewall device servicing a wireless network will need to simultaneously protect a large number of mobile stations. These mobile stations will typically be "always on," and may be providing IP services to clients at any time. Each mobile station may provide many services, as identified by distinct protocol or port numbers. Furthermore, a mobile station may desire to restrict access to a service to a designated set of network sources.

Classic packet filtering technology may not scale while applied to the above scenario. This can be remedied by at least two basic approaches. One approach is through the utilization of brute force. This approach deploys many firewall hosts, each servicing a segment of the mobile station population. Another approach is to enhance the scalability of the packet filtering technology used. Such packet filtering technology should exhibit an improved complexity metric over existing mechanisms.

With reference now to the drawings, FIG. 1 illustrates a block diagram of a communication system 100 utilizing firewall technology that can be implemented in a portable device or terminal, a portable (mobile) phone, a personal data assistant, a personal computer (desktop or laptop), or other electronic and/or communication devices. System 100 includes a packet filter 102 that filters incoming and/or outgoing data, referred to as a data or network packet 104. A packet 104 can be any type of communication, including a group of data, sent and/or communicated from one device to another device.

Packet filter technology inspects each packet (incoming data), classifies each packet, and performs one or more actions as a consequence of such inspection and/or classification. Typical actions are to pass, block, and/or route the packet in a specific manner. Stateful packet filters may also take into account previously seen packets when performing classification.

For illustration purposes and not limitation, packet filter 102 may allow a data packet(s) 104 sent from a sender 106, located on one side of packet filter 102, to be transmitted to a recipient 108, located on the other side of packet filter 102. Packet(s) 104 conveyed by sender 106 that are intended and/or authorized to reach recipient 108 are relayed or allowed to pass through packet filter 102. Packet(s) 104 not intended and/or not authorized for such recipient 108 are blocked by packet filter 102 and not relayed to recipient 108. In such a way, recipient 108 is unaware of and does not receive unwanted packets and/or packets unintended for such recipient 108.

Packet filter(s) 102 are typically configured by specifying a set of classification rules. It is possible to construct very simple packet filters that exhibit O(log N) complexity relative to the size of the rule set, generally by filtering on a very small number of criteria. More sophisticated and flexible packet filters, however, commonly apply a rule set in an essentially linear fashion, yielding O(N) performance. Some packet filtering technologies include optimizations that may allow better than linear performance under specific circumstances, however O(N) remains the worst case performance.

A packet filter with O(N) performance may be acceptable when the number of rules remains relatively small, particularly if each rule allows for rich expression of classification criteria. However, for large numbers of rules, such filters are not viable. A packet filter that protects a large number of systems, and that allows each system to specify a rich security policy, is a good example of an application that needs better performance than extant packet filtering technology.

The embodiments disclosed describe a packet classification mechanism that exhibits asymptotically O(log N) complexity in processing each packet. This mechanism can be utilized in applications that need a scalable means to discriminate between different classes of packet, such as packet filtering, policy routing, and the like.

Figure 2:
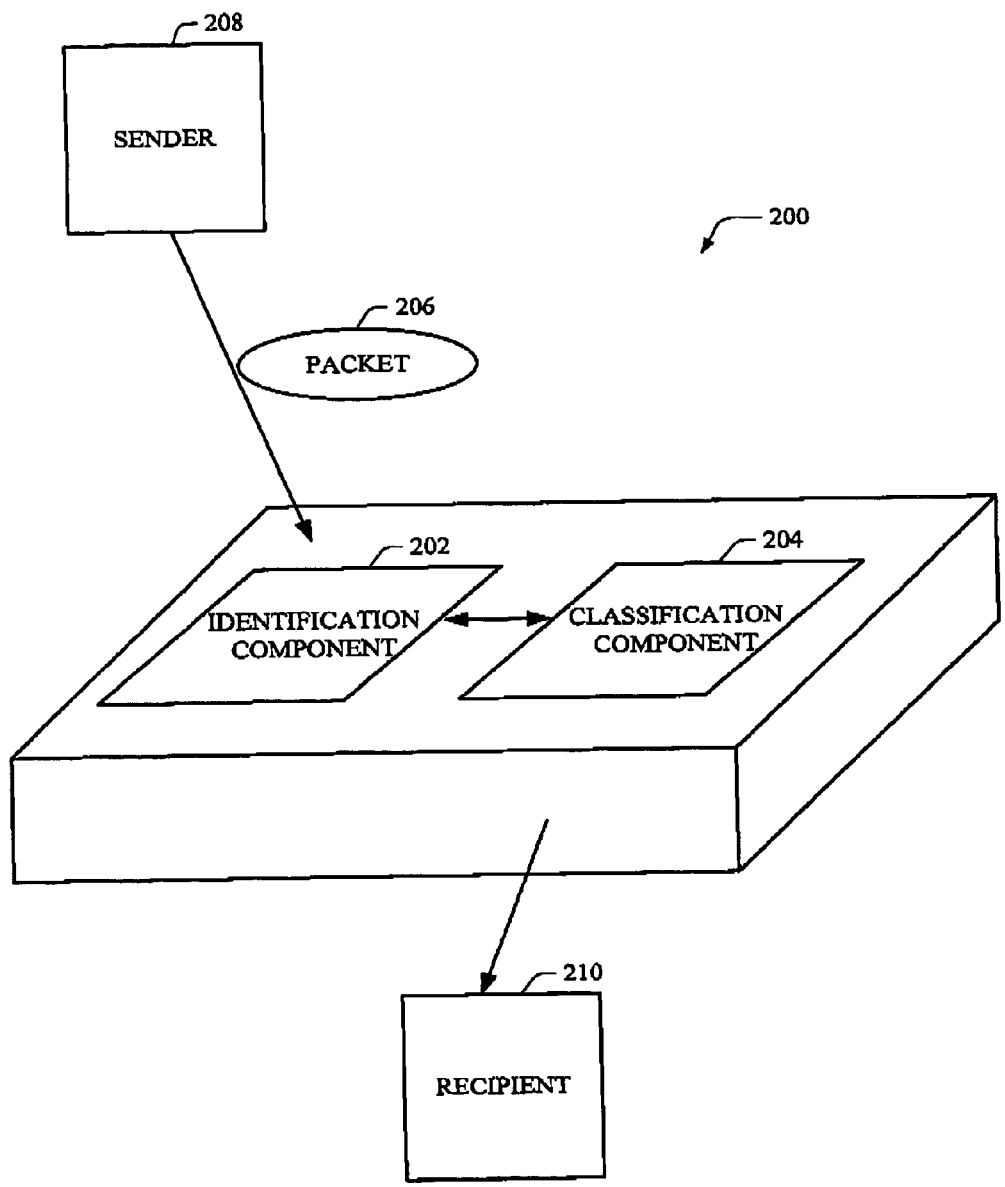
FIG. 2 illustrates a block diagram of a system for classifying packets.

FIG. 2 illustrates a block diagram of a system 200 for classifying packets. According to an aspect, the packet classification system 200 represents each packet as a point and each rule as a prism in n-dimensional space. Fast matching of packets against prisms is achieved by utilizing a spatially indexed data structure. System 200 includes an identification component 202 that interfaces with a classification component 204. Identification component 202 and classification component 204 can be employed separately, as illustrated, or as a single component and can be included as components of a packet filter separately or integrated with a communication device.

Identification component 202 receives a packet 206 and associated feature(s) relayed by a sender 208 that appear to be intended for recipient 210. Sender 208 and/or recipient 210 can be a user and/or entity (e.g., the Internet, another system, a computer, . . . ). Packet 206 possesses a predetermined set of n interesting features that identification component 202 can utilize to define each feature, allowing each feature to be represented by a number that falls within a predetermined range of numbers. Features can be represented by floating point numbers, but are most often integral in nature. Distinct features need not be orthogonal.

Identification component 202 interfaces with and transmits the defined features to classification component 204. Classification component classifies such defined features according to predefined classification rules. Classification of the features includes a determination whether packet 206 is intended and/or authorized for recipient 210 or if packet 206 is unintended and/or unwanted, and thus blocked before reaching recipient 210. For example, classification component 204 can employ packet matching techniques and/or spatial access methods (SAMs), such as R-trees, R+-trees and/or R*-trees. Such techniques will be discussed in connection with further aspects disclosed herein. It is to be understood that while R-trees and their variants are discussed, the systems and/or methods disclosed herein are not limited as such and are equally applicable to any spatial index methods.

Figure 3:
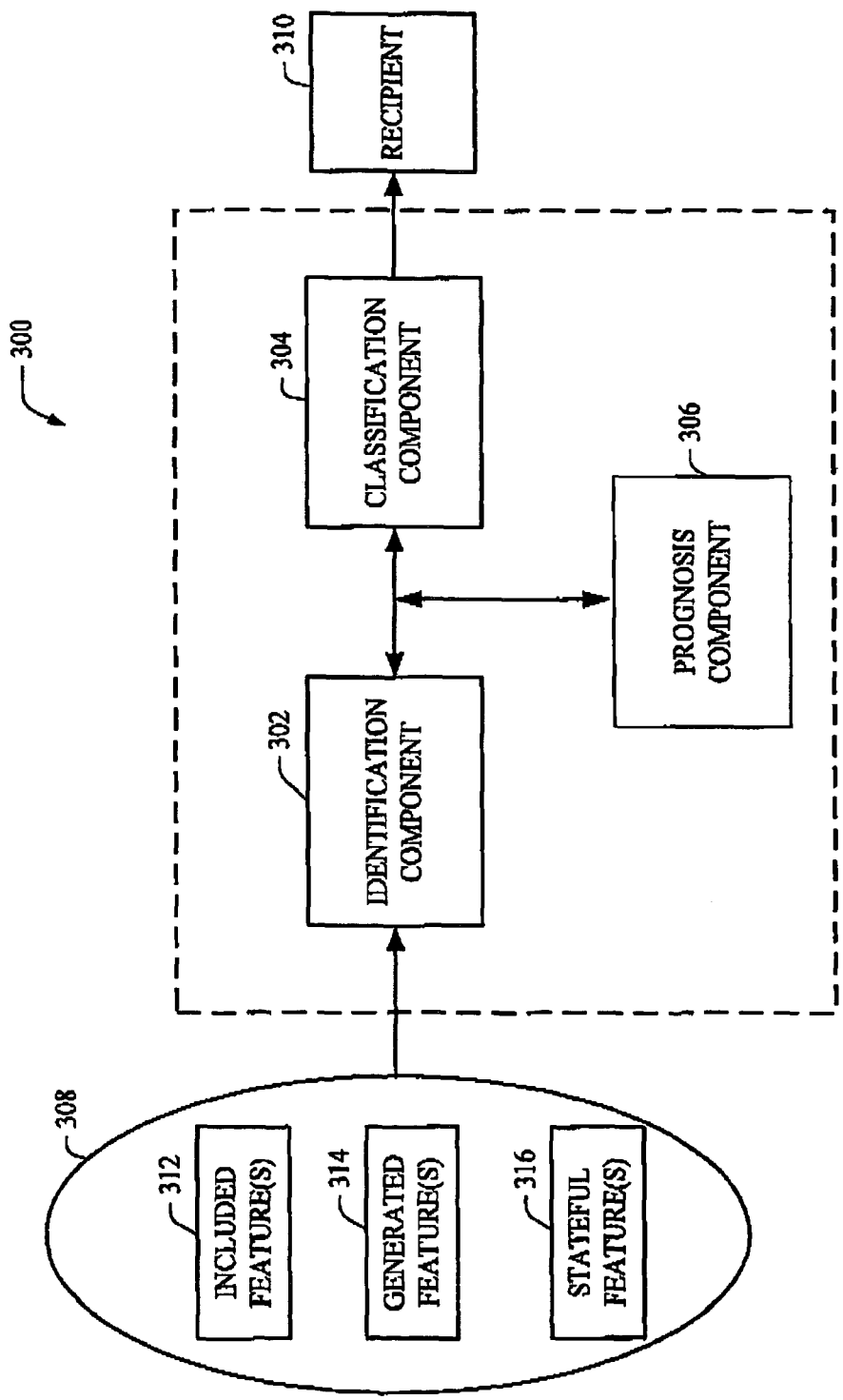
FIG. 3 illustrates packet classification system that defines packets according to features associated with the packets.

Referring now to FIG. 3, illustrated is a system 300 for classifying packets. System 300 includes an identification component 302 that interfaces with a classification component 304, and a prognosis component 306. Identification component 302 receives a data packet 308 intended to be relayed to a recipient 310 and defines packet 308 according to its associated features. The defined associated features are utilized by system 300 to determine if packet 308 is intended for recipient 310 and/or if packet 308 is unwanted by recipient 310. If packet 308 is not intended and/or unwanted by recipient 310 system 300 blocks or prevents packet 308 from reaching recipient 310.

Packet 308 can have a set of n interesting features that can be referred to as included feature(s) 312, generated feature(s) 314, and/or stateful feature(s) 316. For instance, the source and destination address of an IP packet 308 can be utilized directly as included features 312 as they are each representable by an integer with a predetermined range of 0 to $2^{32}-1$, or 0 to $2^{128}-1$, in the case of IPv4, or IPv6, respectively. The upper layer protocol number is another example of a typical included feature 312, being an integer in the range of 0 to 255. In general, information in a packet 308 can be utilized either directly as a feature 312, or to algorithmically construct a feature 312 and 314. In either case, such information generates the feature 312 and 314. Information that may or may not be present in the packet 308 may also be utilized to generate features 312 and 314. A typical example of such information is optional data (such as IPv4 header options and/or IPv6 optional headers).

Information from the packet 308 may also be utilized to generate feature(s) 314, such as fields from encapsulate upper layer protocol headers. Typical examples of such information is TCP or UDP port numbers, and ICMP types and codes. When such optional information is not present, a generated feature 314 takes on a distinguished "undefined" value (which is an element of the feature's range). In other words, when the information is not present, the feature 314 is still defined.

Stateful features 316 can be generated utilizing information recalled from previous packets, through utilization of prognosis component 306. In other words, feature generation may be stateful. Prognosis component 306 can store, record, perform a look up, etc. of packet information and associated features 312-316. Based on such data, prognosis component 306 can infer a stateful feature 316 for a current packet 308 based upon the prognosis stateful feature 316. In such a way, if a particular feature is neither a defined feature 312 nor a generated feature 314, it can still be defined and classified and either allowed access or denied access through a packet filter to recipient 310.

Each packet 308 can be represented as a fixed length feature vector v, consisting of n feature values μ. Each vector v describes a point in an n-dimensional affine feature space F. Accordingly, n-dimensional feature vectors are mapped to points in an n-dimensional feature space.

An axes aligned n-dimensional cuboid ψ in feature space F can be defined by specifying a contiguous sub-range for each feature.

$$\psi = ([\mu_{low_1}, \mu_{high_1}], \ldots [\mu_{low_n}, \mu_{high_n}])$$

These cuboids are referred to as "feature prisms." Each feature prism represents a set of geometrically coherent classification criteria. Prism P encloses vector v if:

$$\forall \mu_i \in v \text{ and } [\mu_{low_1}, \mu_{high_1}] \in \psi$$

$$\mu_{low_1} \leq \mu_i \leq \mu_{high_1}$$

Figure 4:
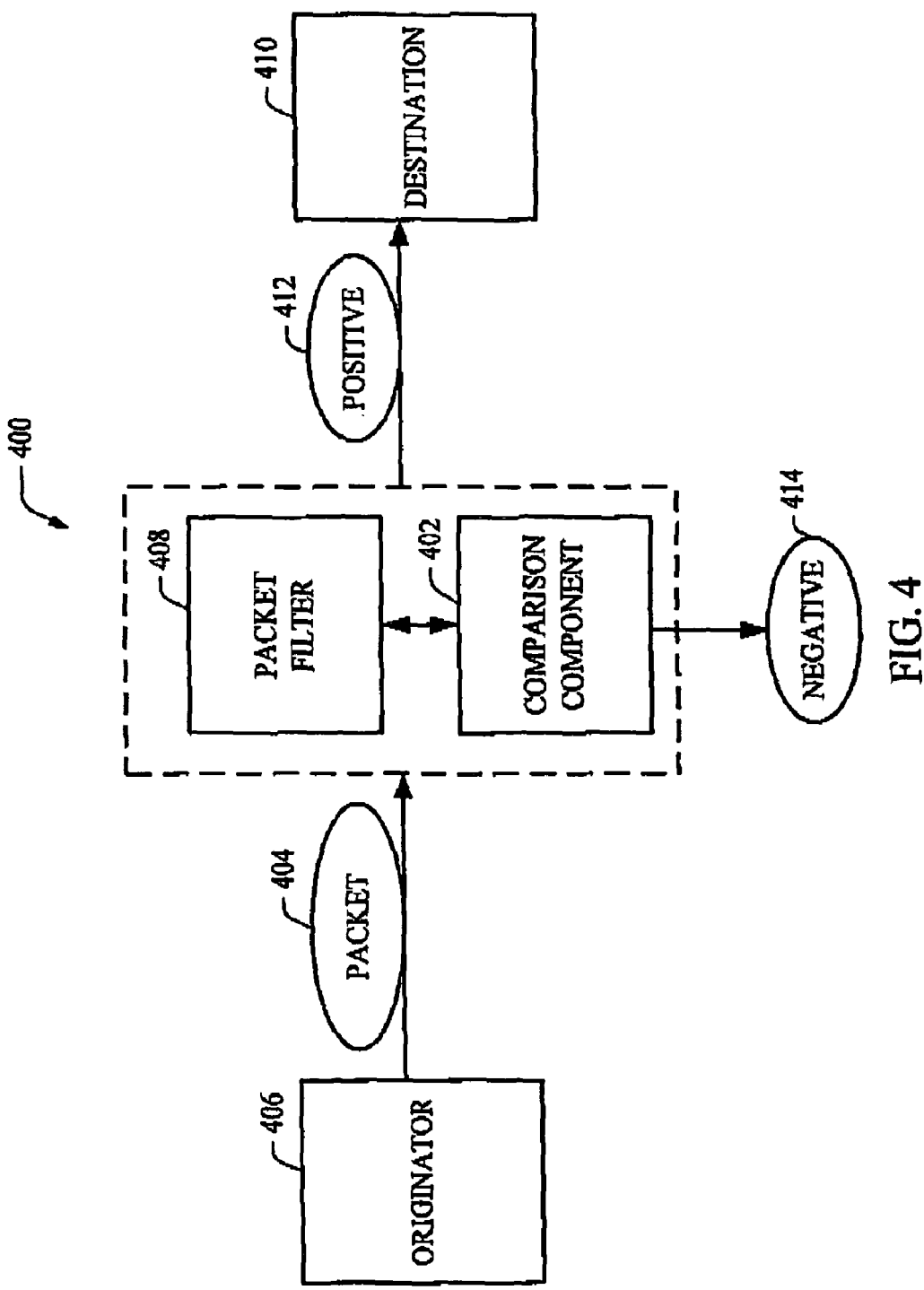
FIG. 4 illustrates a system that applies matching techniques to facilitate denying and/or allowing data access.

FIG. 4 illustrates a system 400 that applies matching techniques to facilitate denying and/or allowing data access. System 400 includes a comparison component 402 that receives a packet 404 from a data originator 406. Comparison component 402 interfaces with a packet filter 408. While matching component 402 and packet filter 408 are illustrated as separate components, it is to be understood that they can comprise the same component.

Packet classification techniques are utilized where P is defined as an arbitrary set of feature prisms, and prism p is defined to be any element of P. Comparison component 402 determines if a vector v of packet 404 matches an arbitrary set of feature prisms P. A feature vector v matches feature prism P if there exists a prism p that encloses vector v. If comparison component 402 finds a match, the associated packet 404 is permitted through the filter 408 and can reach its destination 410. In such a situation, feature prism P represents a positive rule set 412. If comparison component 402 interprets feature prism P as a negative rule set 414, there is not a match. Not having a match results in the packet 404 being blocked by the packet filter 408 and not reaching destination 410.

Classification that is more complex is possible by matching vector v against a sequence, or even a decision tree, of distinct feature prisms P. Accordingly, the packet classification criteria is described as cuboids in an n-dimensional feature space, and feature vectors are matched against criteria by geometrical enclosure.

Efficient determination of whether a point in n dimension falls within one or more regions is a well-studied problem, with extensive literature. Such techniques are generally known as spatial access methods (SAMs). An example of a particularly successful class of SAM is the R-tree and its many variants, such as R+-trees and R*-trees. It is to be understood that while R-trees and their variants are discussed, the systems and/or methods disclosed herein are not limited as such and are equally applicable to any spatial index methods.

R-trees are an extension of the well-known B+-tree data structure, in which the keys are multidimensional rectangles. Interior nodes hold the minimum-bounding rectangle (MBR) for each child. Classic R-trees and R*-trees allow MBRs to overlap, reducing tree size at the cost of potentially more expensive queries (as multiple branches of the tree may need to be traversed). R+-trees, on the other hand, guarantee disjoint MBRs, which may increase tree size (as keys may need to be stored in more than one leaf node). R*-trees are generally regarded as the best performing of the R-tree family. R-trees are dynamic data structures, allowing data to be inserted and/or deleted at any time.

A classifier rule set Ψ may be represented by an R-tree whose leaf MBRs are isomorphic with Ψ's elements. Efficient packet matching may then be achieved by a point query on the tree, which recursively searches nodes whose MBRs enclose the desired point until any matching prisms are found at the leaves. For the purpose of classification, query traversal may be terminated as soon as the first enclosing prism is detected.

Figure 5:
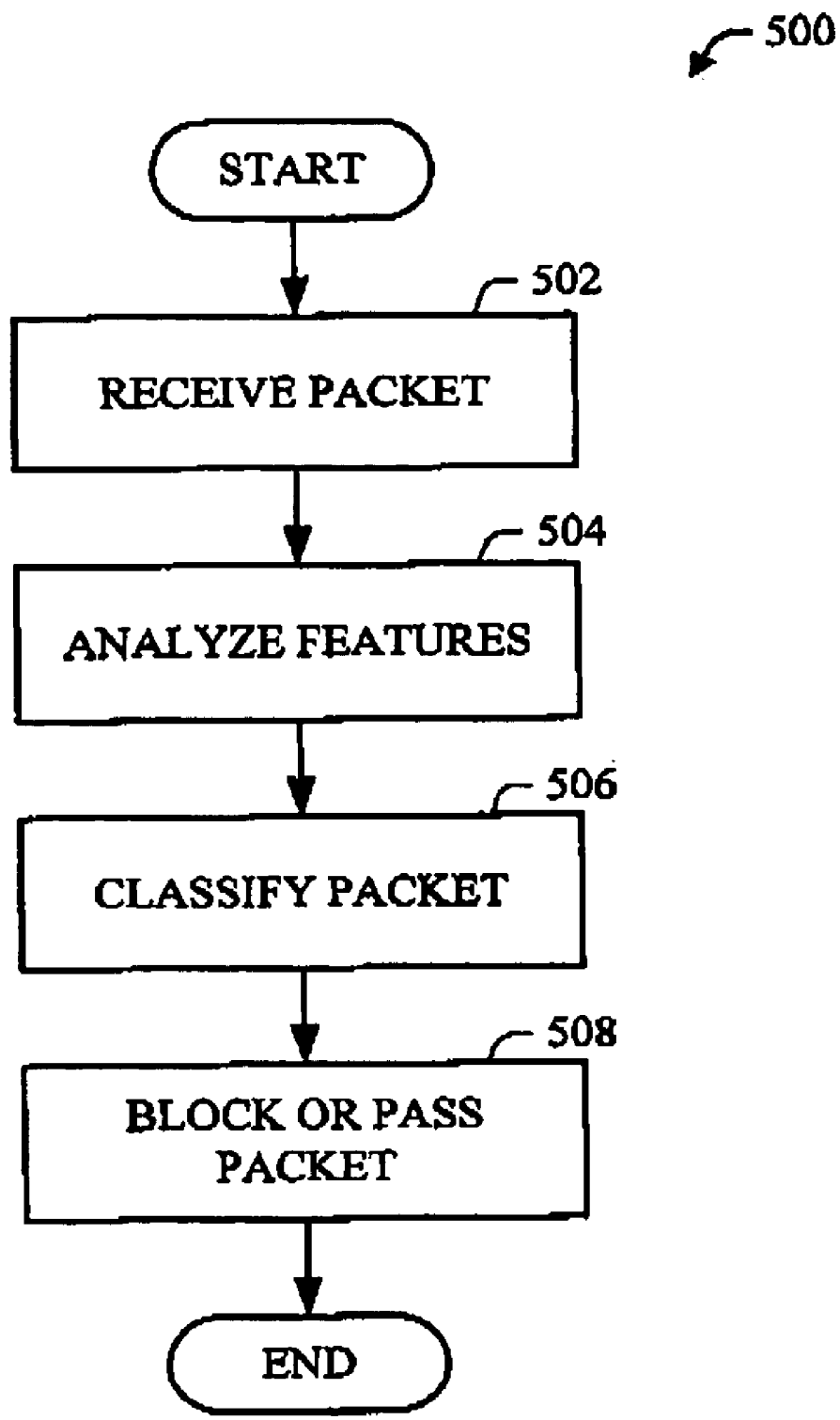
FIG. 5 illustrates a flow chart of a methodology for applying packet classification and matching.

FIG. 5 illustrates a flow chart of a methodology for applying packet classification and matching. While, for purposes of simplicity of explanation, the following methodologies are shown and described as a series of acts, it is to be understood and appreciated that the methodologies are not limited by the order of acts, as some acts may, in accordance with these methodologies, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement the following methodologies.

The method starts, at 502, when a packet is received at firewall that appears to be intended for a recipient protected by such firewall. A firewall technology that can be utilized is a packet filter that passes or blocks packets, but otherwise leaves the traffic flow untouched. The received packet is analyzed, at 504, to determine the intended recipient and to analyze features associated with the packet. For example, there can be a number of features (n features) associated with a packet. These features can be included features, generated features, and/or stateful features. The included features can be the source and destination address of the packet, for example. Generated features are those features algorithmically constructed based on information that may or may not be present in the packet, such as optional data (e.g., IPv4 header options, IPv6 optional headers). Generated features are stateful and can be generated utilizing historical information from previous received packet(s).

The analyzed features are utilized, at 506, to classify the packet. The features are represented by a number (e.g., floating point, integral, . . . ) that falls within a predetermined range of numbers. It should be noted that the features need not be orthogonal. The features are classified according to classification rules that are predefined. The classification rules can employ packet matching techniques and/or spatial access methods (SAMs), such as R-trees, R+-trees, and/or R*-trees. It is to be understood that while R-trees and their variants are discussed, the systems and/or methods disclosed herein are not limited as such and are equally applicable to any spatial index methods.

The classified packet is, at 508, either blocked and not transmitted to the target recipient or allowed to pass to the recipient. A packet is blocked if the identified recipient is not the intended recipient and/or if the packet is not desired by the recipient. For example, a recipient may not want communication from a particular source, subject matter, or other defined criteria. Classified packets falling within the defined criteria are not communicated to recipient, and recipient may remain unaware of the existence of such packets. Classified packets not falling within the defined criteria as allowed to pass through and communicated to the recipient.

Figure 6:
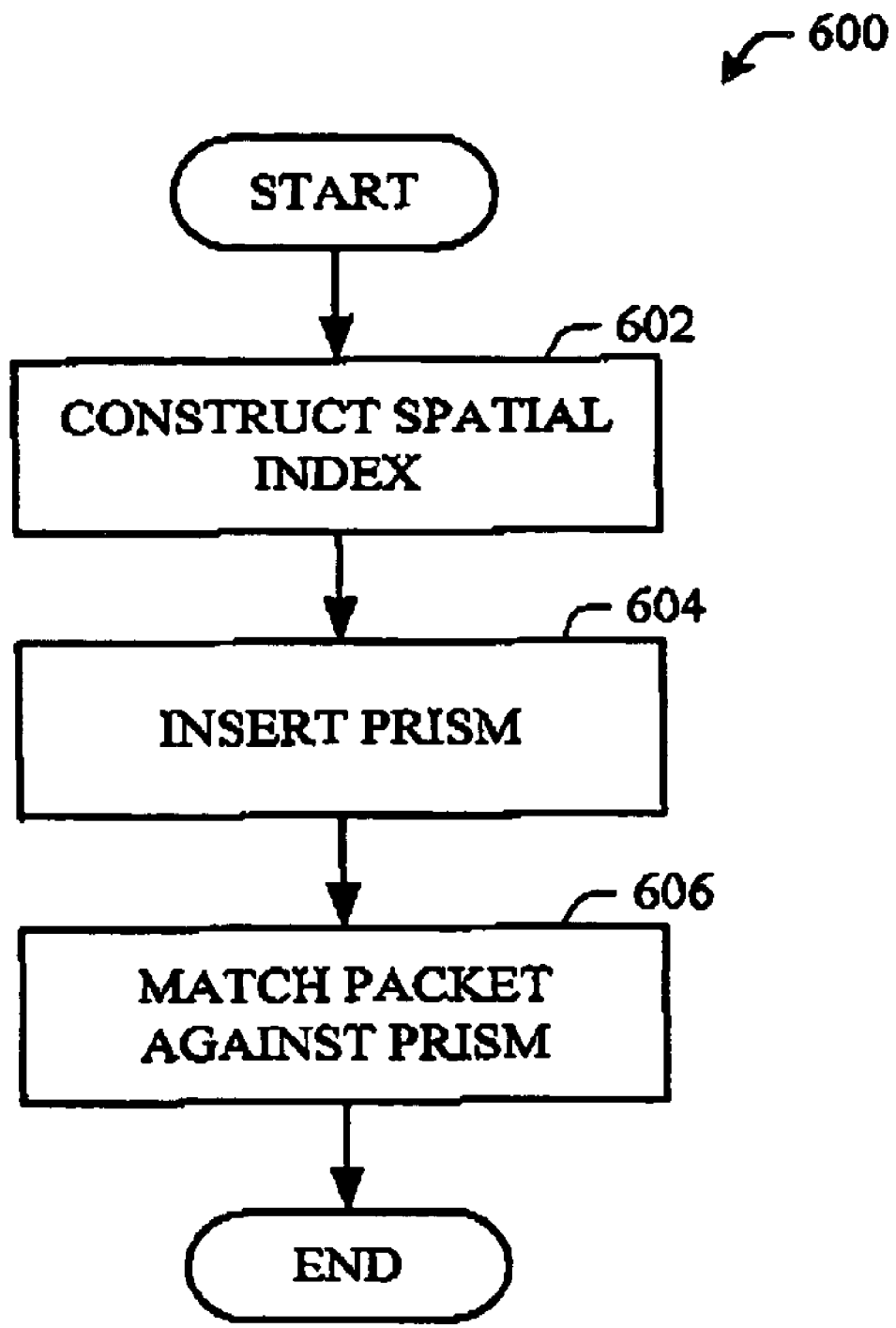
FIG. 6 illustrates a flow chart of a methodology for applying packet matching.

Referring now to FIG. 6, illustrated is a methodology for applying packet matching to facilitate denying and/or allowing data access. The method starts, at 602, where a spatial index is constructed. For example, the packet can be described as a fixed length feature vector v. The feature vector can be an n-dimensional feature and the feature space can be an n-dimensional feature space. The feature vector can comprise features represented by a number wherein the number is within a predetermined range and can be generated based on at least one feature of the packet.

The method continues, at 604, where a prism P is inserted into the spatial index. The prism is an axis-aligned n-dimensional cuboid in feature space and is defined by specifying a contiguous subrange for each axis. Each feature prism represents a set of geometrically coherent classification criteria. The packet is then matched against the prism, at 606. For example, a feature vector v of the packet matches a feature prism P if there exists a prism p that encloses vector v.

$$\forall \mu_i \in v \text{ and } [\mu_{low_1}, \mu_{high_1}] \in \psi$$

$$\mu_{low_1} \leq \mu_i \leq \mu_{high_1}$$

If there is a match, feature prism P represents a positive rule set. With a match access to the data is permitted and can reach its intended destination. If there is not a match, feature prism P is a negative rule set and data access is blocked. The matching can alternatively or in addition be performed by utilizing point queries σ, which is performed utilizing a random point from inside each prism. The σ point queries cab also be performed utilizing randomly generated "typical" vectors. After the σ point queries are performed a determination is made whether the point queries successfully matched a prism.

Figure 7:
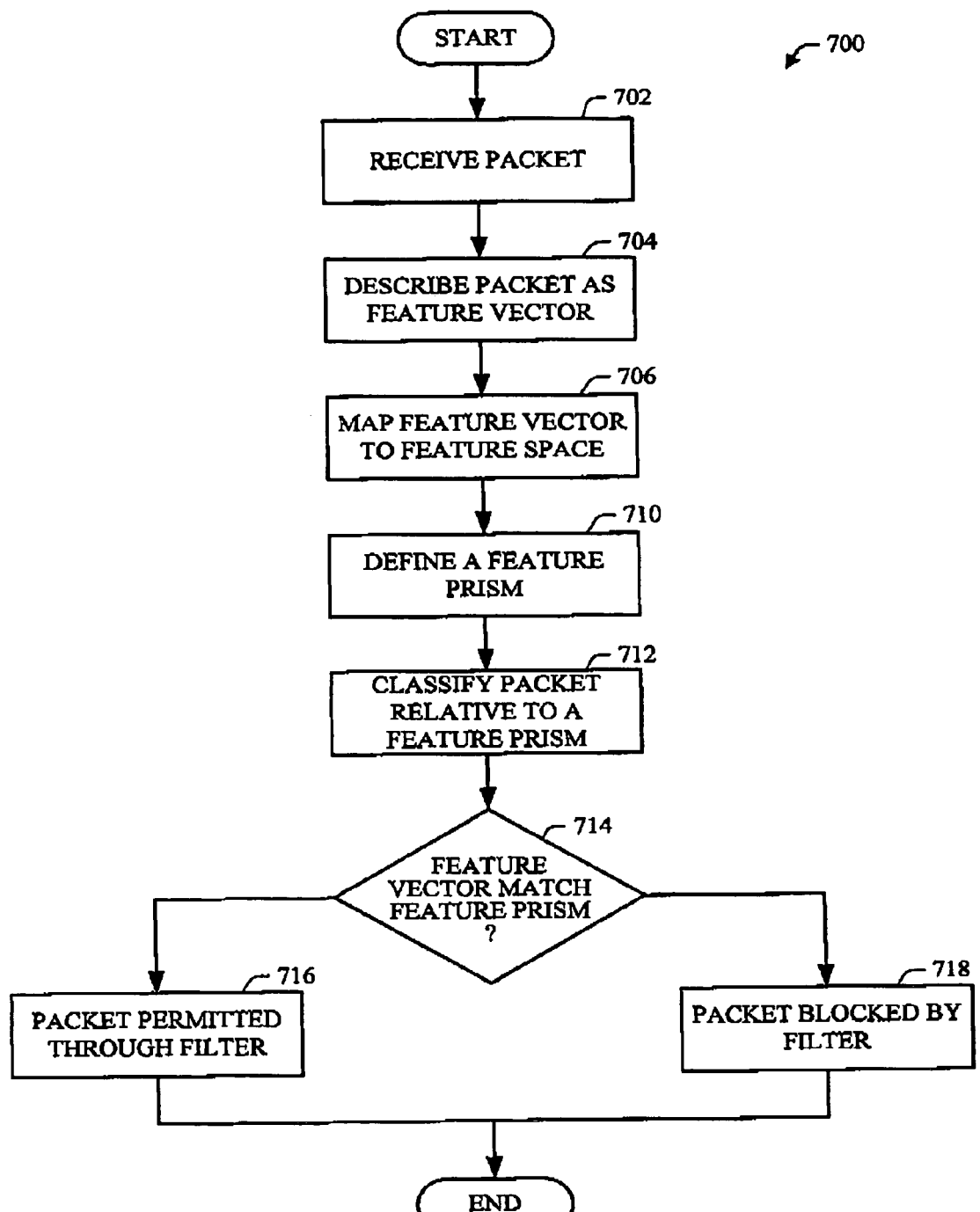
FIG. 7 illustrates a flow chart of a methodology for classifying a packet and applying filtering techniques.

FIG. 7 illustrates a flow chart of a methodology for classifying a packet. The method starts, at 702, when a packet is received at a packet filter, for example, intended for a recipient that is protected from unwanted and/or unauthorized packets. The packet can be received from a user and/or entity (e.g., the Internet, another system, a computer, . . . ). Upon receipt of the packet, at 704, the packet is described as a feature vector, which is a vector of specific feature values. Each packet can be represented as a fixed length feature vector v, consisting of n feature values μ. Each feature vector v describes a point in an n-dimensional affine feature space F.

The method continues, at 706, where the feature vector v is mapped to points in an n-dimensional feature space. At 710, a feature prism P, which is an axis-aligned n-dimensional cuboid in feature space F, is defined by specifying a contiguous subrange for each axis. At 712, a set of feature prisms forming a rule set of a packet classifier is binary classified relative to a feature prism P. A determination is made, at 714, whether the feature vector v matches the feature prism P. A feature vector v of the packet matches a feature prism P if there exists a prism p that encloses vector v. If the determination is "yes," there is a match and the packet is represented as a positive rule set and permitted access through the packet filter, at 716. If the determination is "no," there is not a match and the packet is represented as a negative rule set and the packet is blocked by filter, at 718.

Figure 8:
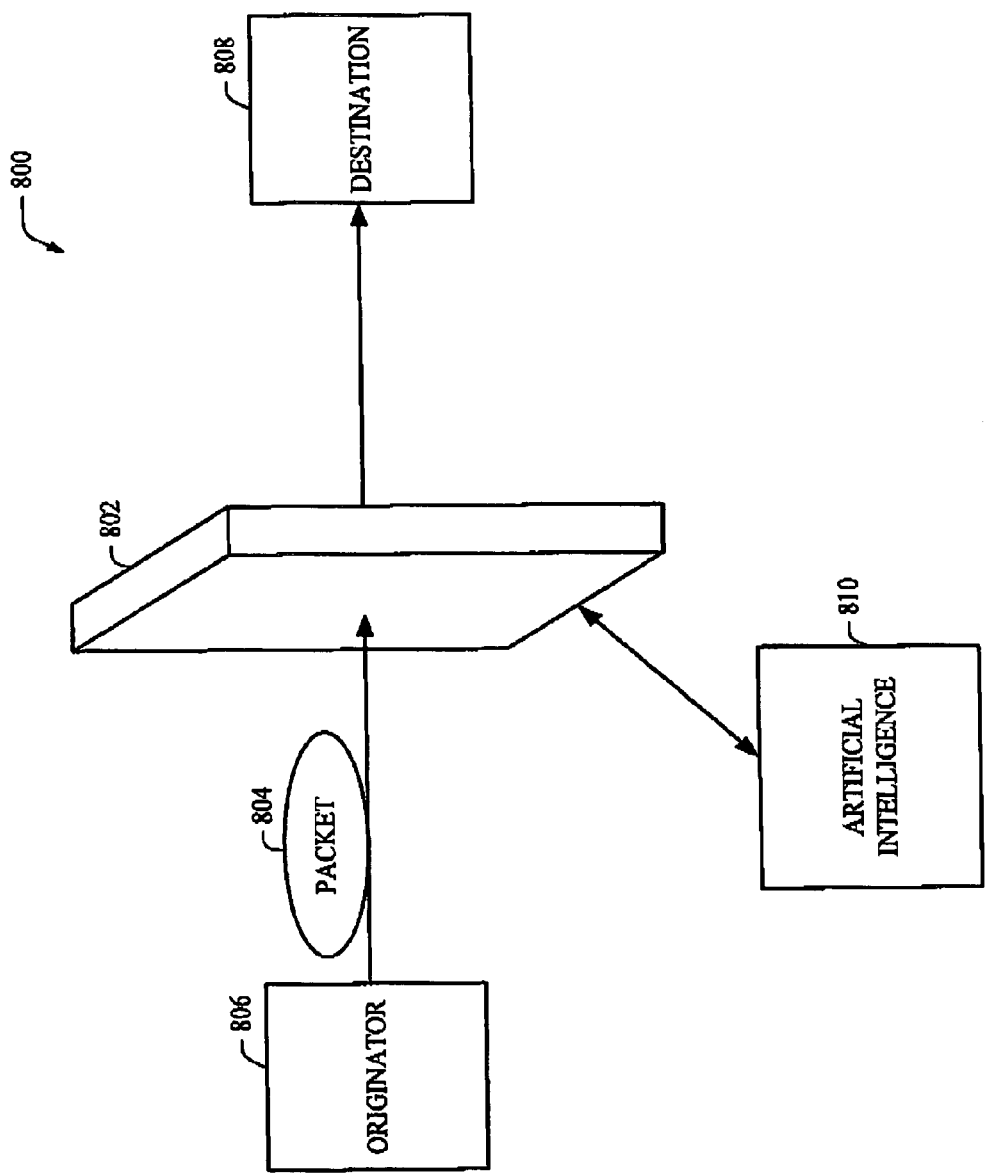
FIG. 8 illustrates a communication system that includes an artificial intelligence-based component that can automate functionality with respect to packet filters.

FIG. 8 illustrates a communications system 800 that employs artificial intelligence (AI), which facilitates automating one or more features associated with a packet filter 802. The packet filter 802 receives a packet 804 from a data originator 806 intended for a destination 808 that is protected by packet filter 802. Packet filter 802 can work in conjunction with an artificial intelligence component 810 to minimize unauthorized and/or unwanted packets 804 from reaching a protected destination 808.

A communication system (e.g., in connection with classifying and filtering packets) can employ various AI-based schemes for carrying out various aspects thereof. For example, a process for determining if a packet of data is authentic and/or intended for a particular recipient can be facilitated through utilization of an automatic classifier system and process. Moreover, where multiple communication systems are employed having the same or similar resources, the classifier can be employed to determine which packet filter to employ in a particular situation.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. In the case of communication systems, for example, attributes can be features, words, phrases or other data-specific attributes derived from the features (e.g., included, generated, stateful), and the classes are categories or areas of interest (e.g., levels of classification and/or matching).

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the system can employ classifiers that are explicitly trained (e.g., through utilization of a generic training data) as well as implicitly trained (e.g., by observing user behavior, receiving extrinsic information). For example, SVM's are configured by means of a learning or training phase within a classifier constructor and feature selection module. Thus, the classifier(s) can be used to automatically learn and perform a number of functions, including but not limited to determining according to a predetermined criteria when to block a packet, when to permit a packet to pass though the filter, etc.

Figure 9:
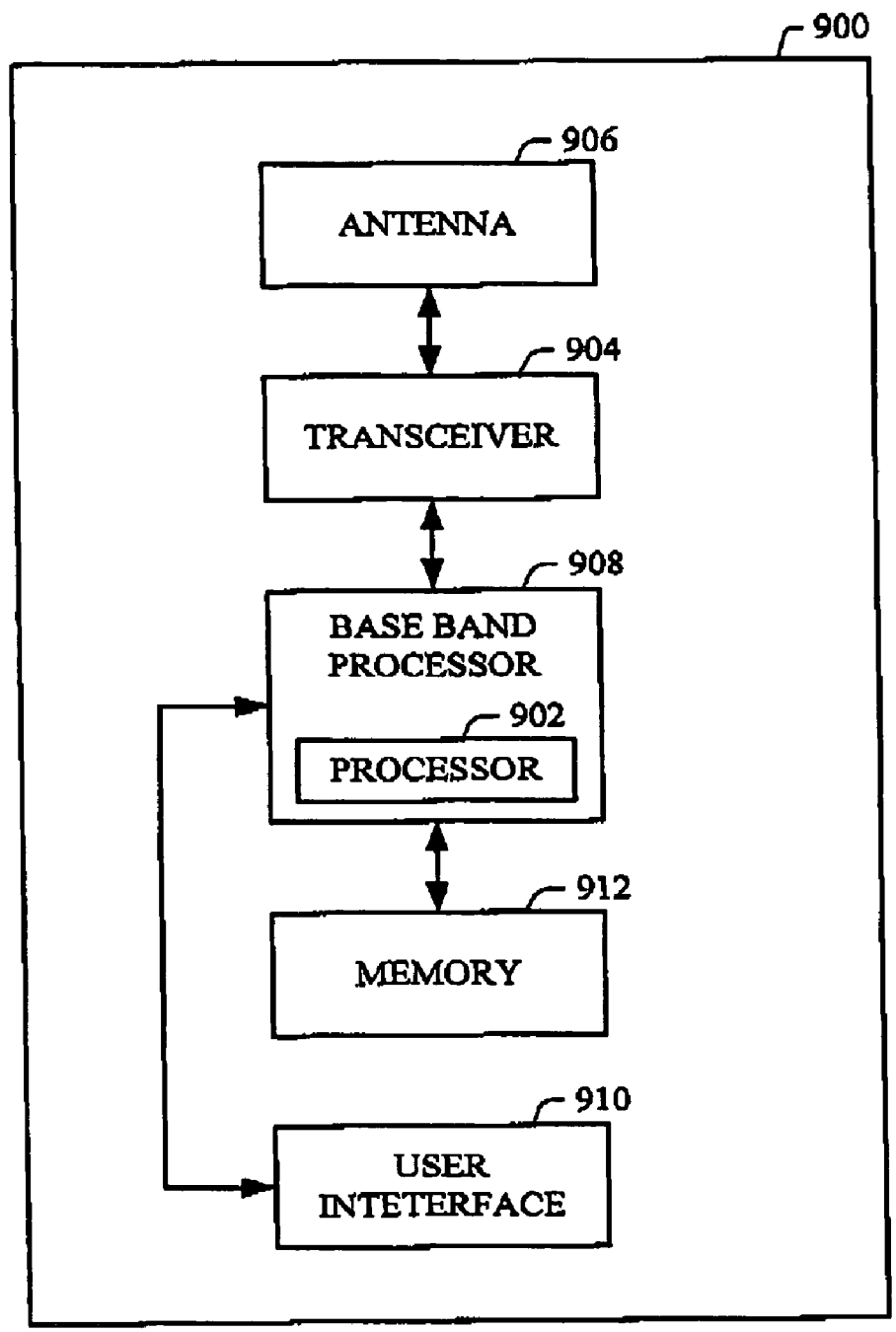
FIG. 9 illustrates a conceptual block diagram of a configuration of a terminal.

With reference now to FIG. 9, illustrated is a conceptual block diagram of a possible configuration of a terminal 900. As those skilled in the art will appreciate, the precise configuration of the terminal 900 may vary depending on the specific application and the overall design constraints. Processor 902 can implement the systems and methods disclosed herein.

Terminal 900 can be implemented with a front end transceiver 904 coupled to an antenna 906. A base band processor 908 can be coupled to the transceiver 904. The base band processor 908 can be implemented with a software based architecture, or any other type of architecture. A microprocessor can be utilized as a platform to run software programs that, among other functions, provide control and overall system management function. A digital signal processor (DSP) can be implemented with an embedded communications software layer, which runs application specific algorithms to reduce the processing demands on the microprocessor. The DSP can be utilized to provide various signal processing functions such as pilot signal acquisition, time synchronization, frequency tracking, spread-spectrum processing, modulation and demodulation functions, and forward error correction.

Terminal 900 can also include various user interfaces 910 coupled to the base band processor 908. User interfaces 910 can include a keypad, mouse, touch screen, display, ringer, vibrator, audio speaker, microphone, camera and/or other input/output devices.

The base band processor 908 comprises a processor 902. In a software based implementation of the base band processor 908, the processor 902 may be a software program running on a microprocessor. However, as those skilled in the art will readily appreciate, the processor 902 is not limited to this embodiment, and may be implemented by any means known in the art, including any hardware configuration, software configuration, or combination thereof, which is capable of performing the various functions described herein. The processor 902 can be coupled to memory 912 for the storage of data.

It is to be understood that the embodiments described herein may be implemented by hardware, software, firmware, middleware, microcode, or any combination thereof. When the systems and/or methods are implemented in software, firmware, middleware or microcode, program code or code segments, they may be stored in a non-transitory machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

What has been described above includes examples of one or more embodiments. It is, of course, not possible to describe every conceivable combination of components or methodologies for purposes of describing these embodiments, but one of ordinary skill in the art may recognize that many further combinations and permutations of such embodiments are possible. Accordingly, the embodiments described herein are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A method performed by a classification system for classifying a packet, comprising:
   receiving, at the classification system, a packet destined for a recipient, the received packet comprising a plurality of included features;
   describing the packet as a feature vector, the feature vector comprising at least one feature that is algorithmically-generated at the classification system based on one or more of the plurality of included features or from previously received packets, wherein the at least one algorithmically-generated feature is represented by an undefined value that is an element of a range of the at least one algorithmically-generated feature, the undefined value indicating that at least one optional field is not present in the received packet; and
   mapping the feature vector to a feature space by employing one or more spatial access methods to classify the feature vector according to one or more classification rules, wherein the one or more spatial access methods have a non-linear complexity with respect to a number of the one or more classification rules, and wherein the one or more spatial access methods include one or more of an R-tree, an R+-tree, or an R*-tree whose leaf minimum-bounding rectangles are isomorphic with the one or more classification rules.

2. The method of claim 1, further comprising:
   defining a feature prism;
   classifying the packet relative to the feature prism; and
   determining if the feature vector matches the feature prism.

3. The method of claim 2, further comprising:
   allowing the packet to be transmitted through a packet filter if the feature vector matches the feature prism.

4. The method of claim 2, further comprising:
   blocking the packet with a packet filter if the feature vector does not match the feature prism.

5. The method of claim 2, wherein a feature vector v of the packet matches a feature prism P if there exists a prism p that encloses vector v.

6. The method of claim 1, wherein the feature vector is an n-dimensional feature vector.

7. The method of claim 1, wherein the feature space is an n-dimensional feature space.

8. The method of claim 1, wherein the feature vector comprises features represented by a number.

9. The method of claim 8, wherein the features are represented by a number within a predetermined range.

10. The method of claim 8, wherein the number is a generated number based on at least one feature of the packet.

11. The method of claim 1, wherein describing the packet as a feature vector is described based on packet classification criteria.

12. The method of claim 1, wherein the complexity of the one or more spatial access methods exhibits an asymptotic behavior with an increase in the number of the one or more classification rules.

13. An apparatus for classifying a packet, comprising:
    an identification component that receives a packet comprising a plurality of included features and defines the packet as a feature vector, the feature vector comprising at least one feature that is algorithmically-generated at the apparatus based on one or more of the included features or from previously received packets, wherein the at least one algorithmically-generated feature is represented by an undefined value that is an element of a range of the at least one algorithmically-generated feature, the undefined value indicating that at least one optional field is not present in the received packet; and
    a classification component that classifies the packet based at least in part upon the at least one algorithmically-generated feature, wherein the classification component employs one or more spatial access methods to classify the packet according to one or more classification rules, wherein the one or more spatial access methods have a non-linear complexity with respect to a number of the one or more classification rules, and wherein the one or more spatial access methods include one or more of an R-tree, an R+-tree, or an R*-tree whose leaf minimum-bounding rectangles are isomorphic with the one or more classification rules.

14. The apparatus of claim 13, wherein the identification component defines the at least one feature of the packet as a number that is included within a predetermined range.

15. The apparatus of claim 13, further comprising:
    a prognosis component that generates a stateful feature based, at least in part on, information from previous packets.

16. The apparatus of claim 13, further comprising:
    a comparison component that applies matching techniques to facilitate categorizing a data access of the packet.

17. The apparatus of claim 13, wherein the feature vector further comprises at least one of the plurality of included features.

18. The apparatus of claim 13, wherein the at least one feature is a stateful feature.

19. The apparatus of claim 13, wherein the apparatus comprises a mobile phone.

20. The apparatus of claim 13, wherein the apparatus comprises a personal data assistant.

21. The apparatus of claim 13, wherein the apparatus comprises a personal computer.

22. The apparatus of claim 13, wherein the complexity of the one or more spatial access methods exhibits an asymptotic behavior with an increase in the number of the one or more classification rules.

23. A system for classifying a data packet, comprising:
   means for receiving a data packet destined for a recipient, the received packet comprising a plurality of included features;
   means for describing the data packet as a feature vector, the feature vector comprising at least one feature that is algorithmically-generated at the system based on one or more of the plurality of included features or from previously received packets, wherein the at least one algorithmically-generated feature is represented by an undefined value that is an element of a range of the at least one algorithmically-generated feature, the undefined value indicating that at least one optional field is not present in the received packet; and
   means for corresponding the feature vector to a feature space employing one or more spatial access methods to classify the feature vector according to one or more classification rules, wherein the one or more spatial access methods have a non-linear complexity with respect to a number of the one or more classification rules, and wherein the one or more spatial access methods include one or more of an R-tree, an R+-tree, or an R*-tree whose leaf minimum-bounding rectangles are isomorphic with the one or more classification rules.

24. The system of claim 23, further comprising:
   means for defining a feature prism;
   means for categorizing the data packet in relation to the feature prism; and
   means for matching the feature vector to the feature prism.

25. The system of claim 24, further comprising:
   means for allowing the data packet to pass to a recipient if the feature vector matches the feature prism.

26. The system of claim 24, further comprising:
   means for blocking the data packet from a recipient if the feature vector does not match the feature prism.

27. The system of claim 23, wherein the feature vector comprises features representable by a number.

28. The system of claim 27, wherein the features are representable by a number within a predetermined range.

29. The system of claim 27, wherein the number is a generated number based on at least one feature of the packet.

30. The system of claim 23, wherein the feature vector is an n-dimensional feature vector.

31. The system of claim 23, wherein the feature space is an n-dimensional feature space.

32. A portable communication device comprising the system of claim 23.

33. The system of claim 23, wherein the complexity of the one or more spatial access methods exhibits an asymptotic behavior with an increase in the number of the one or more classification rules.

34. A processor that executes instructions embodied on a non-transitory computer-readable medium for applying packet matching, the instructions configured for:
   constructing a spatial index;
   inserting prisms into the spatial index;
   receiving one or more packets, each packet comprising a plurality of included features;
   describing the one or more packets as feature vectors, a feature vector comprising at least one feature that is algorithmically-generated by the processor based on one or more of the plurality of included features or from previously received packets, wherein the at least one algorithmically-generated feature is represented by an undefined value that is an element of a range of the at least one algorithmically-generated feature, the undefined value indicating that at least one optional field is not present in the received packet; and
   matching feature vectors against prisms by employing one or more spatial access methods to classify the feature vectors according to one or more classification rules, wherein the one or more spatial access methods have a non-linear complexity with respect to a number of the one or more classification rules, and by performing feature queries on the spatial index, and wherein the one or more spatial access methods include one or more of an R-tree, an R+-tree, or an R*-tree whose leaf minimum-bounding rectangles are isomorphic with the one or more classification rules.

35. The processor of claim 34, wherein the complexity of the one or more spatial access methods exhibits an asymptotic behavior with an increase in the number of the one or more classification rules.

36. A computer program product configured for classifying a packet, comprising:
   a non-transitory computer-readable medium comprising:
      a first set of codes for causing a computer to receive a packet destined for a recipient, the received packet comprising a plurality of included features;
      a second set of codes for causing the computer to describe the packet as a feature vector, the feature vector comprising at least one feature that is an algorithmically-generated by the computer based on one or more of the plurality of included features or from previously received packet, wherein the at least one algorithmically-generated feature is represented by an undefined value that is an element of a range of the at least one algorithmically-generated feature, the undefined value indicating that at least one optional field is not present in the received packet; and
      a third set of codes for causing the computer to map the feature vector to a feature space by employing one or more spatial access methods to classify the feature vector according to one or more classification rules, wherein the one or more spatial access methods have a non-linear complexity with respect to a number of the one or more classification rules, and wherein the one or more spatial access methods include one or more of an R-tree, an R+-tree, or an R*-tree whose leaf minimum-bounding rectangles are isomorphic with the one or more classification rules.

37. The computer program product of claim 36, wherein the complexity of the one or more spatial access methods exhibits an asymptotic behavior with an increase in the number of the one or more classification rules.

* * * * *